United States Patent [19]
Bilson

[11] Patent Number: 5,217,323
[45] Date of Patent: Jun. 8, 1993

[54] METHOD AND APPARATUS FOR DISTRIBUTING GRAYWATER

[76] Inventor: Stephen W. Bilson, 438 Addison Ave., Palo Alto, Calif. 94301

[21] Appl. No.: 824,931

[22] Filed: Jan. 23, 1992

[51] Int. Cl.$^5$ .................................. E02B 13/00
[52] U.S. Cl. .................................... 405/43; 405/36; 405/45
[58] Field of Search ........................ 405/36–51, 405/52; 137/236.1

[56] References Cited

U.S. PATENT DOCUMENTS

| | | | |
|---|---|---|---|
| 419,242 | 1/1890 | Brown | 405/39 X |
| 3,817,454 | 6/1974 | Pira | 239/76 |
| 4,112,972 | 9/1978 | Lajeuness | 137/236.1 X |
| 4,180,348 | 12/1979 | Taylor | 405/39 |
| 4,402,631 | 9/1983 | Rosenthal | 405/43 |
| 4,697,609 | 10/1987 | Salewski | 137/236.1 X |
| 4,721,408 | 1/1988 | Hewlett | 405/48 |
| 4,890,640 | 1/1990 | King | 405/37 X |
| 4,928,727 | 5/1990 | Dufresne | 137/236.1X |
| 4,930,934 | 6/1990 | Adkins | 405/37 |
| 5,024,555 | 6/1991 | York | 405/46 X |
| 5,102,259 | 4/1992 | York et al. | 405/46 X |

Primary Examiner—Dennis L. Taylor
Attorney, Agent, or Firm—Townsend and Townsend Khourie and Crew

[57] ABSTRACT

Method and apparatus for distributing graywater from graywater sources exclusive of sewer sources has a plurality of distributors dispersed in a ground distribution area, each distributer having a cavity with a top and a bottom which is vertically displaced from the top, an inlet port in the top, and an outlet means, wherein the outlet means includes a graywater-to-ground interface means forming the bottom of the cavity. The outlet means is preferably a perforate screen and the cavity is preferably a frustoconical section designed for burial in the ground in a hole of less than about one foot in diameter. Gravity feed or pressure feed may force the graywater into the soil without allowing the graywater to stagnate. The shape of the cavity prevents vertical displacement of the distributor when it is buried. A one-time inlet connector port assures that feed conduit is not inadvertently removed. A filter system prevents graywater from backing up.

21 Claims, 3 Drawing Sheets

METHOD AND APPARATUS FOR DISTRIBUTING GRAYWATER

BACKGROUND OF THE INVENTION

The present invention relates to an improved device for subsurface distribution of graywater for irrigation.

Research and field testing has shown that drip irrigation systems save water when compared to all other irrigation systems. It has also been shown that drip irrigation under the soil's surface further prevents evaporation loss. Irrigation systems for subsurface distribution of water have heretofore been limited to use with clear water.

Graywater comes from inside houses and includes all used water except toilet water. Graywater from showers, tubs, and clotheswashers has recently been shown to be a viable source of irrigation water. Because of the possibility of disease transmittal through contact with graywater, it must by law be distributed subsurface.

The most practical method for transporting graywater is through a pressurized tube system commonly used in clear water irrigation. However, even when filtered by most known methods, graywater contains suspended solids which eventually clog up devices designed for pressurized clear water drip systems. These systems can be on the surface or buried.

When drip irrigation systems are buried, it is an expensive and time consuming process to dig them up when they become inoperative. It is therefore very important that once buried, they stay in working order. Dogs, deer, children, gardeners, etc., can cause these systems to leak if they are not kept buried properly. The possibility of contamination would then become present.

Existing subsurface drip irrigation systems have many designs, but all revolve around the same two methods.

The first method is a pressurizable tubing usually made of a ½" to ¾" pliable plastic material like polyethylene. This tubing will either have some sort of openings along its length, or have drip emitters stuck through it along its length. These openings can have different shapes and sizes, with or without internal or external structures surrounding them. These openings, as do drip emitters, control the release of pressurized water from inside the tubing to the soil, and may or may not be protected by another layer of tubing or some other method of restricting roots or soil from entering the openings.

Drip emitters have many unique abilities when used with clear water. To be effective, they must be either applied on the tubing in several places at the installation site or in the factory. Each application takes time, and each emitter costs money. Many are relatively expensive.

The second and less preferred method is a leach field. This consists of a non-pressurizable pipe usually about 3" in diameter, with holes along its entire length big enough to not clog up from graywater. The pipe is laid in a shallow trench with its holes facing down. Water entering this pipe will run via gravity to fill up the pipe, then will eventually seep down through the holes, into gravel surrounding the pipe, then slowly into the soil. Gravel is put there to keep soil from entering the pipe.

The problem with the leach field method is it requires a long linear trench be dug for the perforated pipe. Buried objects like roots and irrigation pipes, and surface objects like sidewalks, often prohibit linear digging. Existing gardens, the most common place for installation of a graywater system's distribution device, are full of these obstructions.

Accordingly, it would be desirable to provide a device which can be used for subsurface distribution of graywater under pressure, which is inexpensive to manufacture and install, which will remain safe, which will not clog up, and which can be used in obstructionist environments.

SUMMARY OF THE INVENTION

According to the invention, method and apparatus for distributing graywater from graywater sources exclusive of sewer sources has a plurality of distributors dispersed in a ground distribution area, each distributer having a cavity with a top and a bottom which is vertically displaced from the top, an inlet port in the top, and an outlet means, wherein the outlet means includes a graywater-to-ground interface means forming the bottom of the cavity. The outlet means is preferably a perforate screen and the cavity is preferably a frusto-conical section designed for burial in the ground in a hole of less than about one foot in diameter. Gravity feed or pressure feed may force the graywater into the soil without allowing the graywater to stagnate. The shape of the cavity prevents vertical displacement of the distributor when it is buried. A one-time inlet connector port assures that feed conduit is not inadvertently removed. A filter system prevents graywater from backing up.

The invention will be better understood by reference to the following detailed description in connection with the accompanying drawings.

DESCRIPTION OF THE PREFERRED EMBODIMENT

Figure 1:
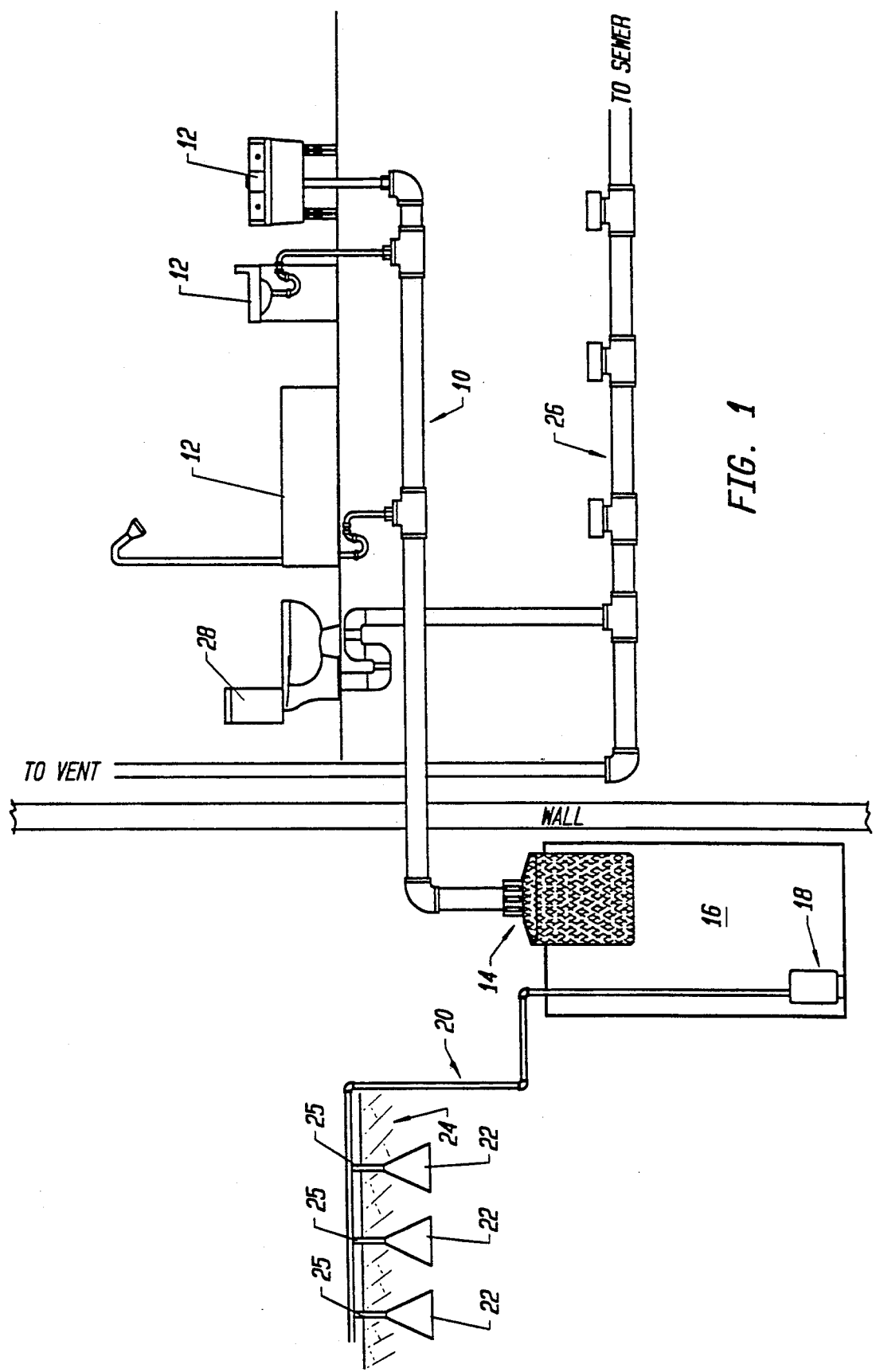
FIG. 1 is a block diagram of a graywater distribution system according to the invention.

As illustrated in FIG. 1, the invention provides a method and apparatus for distributing graywater from household sources 12 to a ground distribution area 24. Graywater includes waste water from household sources such as sinks, showers, dishwashers and washing machines, but does not include sewage water, i.e. waste water from household toilets.

The method of the present invention, in a preferred embodiment, includes the steps of collecting graywater from graywater sources 12 through closed conduits 10, 20; delivering water via the closed conduits to an inlet of each one of a plurality of distribution means 22 dispersed in a ground distribution area 24, wherein each of the distribution means comprises a cavity having a top and a bottom vertically displaced from the top, an inlet port in the top, and an outlet means, the outlet means including a graywater-to-ground interface means forming the bottom; and releasing the graywater in the cavity to the ground 24 through the interface means. Preferably, the distribution means 22 are buried below ground level.

In a preferred embodiment, the water is released from the cavity of the distribution means by positive hydraulic pressure exerted by a pump system 18 in storage tank 16. Preferably, water is fed under positive hydraulic pressure to distribution means 22 by pump 18 immediately in response to the presence of graywater in tank 16. Alternatively, the graywater is released from distribution means 22 by gravitational force.

Preferably, the method further includes filtering the graywater in filter system 14 prior to delivering it to the distribution means 22.

The present invention provides, as illustrated in FIG. 1, a system for distributing graywater from graywater sources exclusive of sewer sources. The system includes means for collecting graywater from graywater sources through closed conduits, which preferably comprises a collection conduit 10 into which graywater from household sources 12 drains. Graywater flows through collection conduit 10 to tank 16, preferably through filter system 14, which will be described more fully below. Filter system 14 removes solids from the gray water, and the graywater collects in tank 16.

In a preferred embodiment, a pump system 18 disposed in tank 18 pumps the graywater through distribution conduit 20 to distribution means 22 dispersed in ground distribution area 24, which, for example, may be a yard or garden area. The pump system 18 preferably pumps graywater from tank 16 immediately upon the presence of graywater in tank 16. Distribution means 22 are preferably buried in the ground, and are connected to conduit 20 through branch conduits 25.

Figure 2:
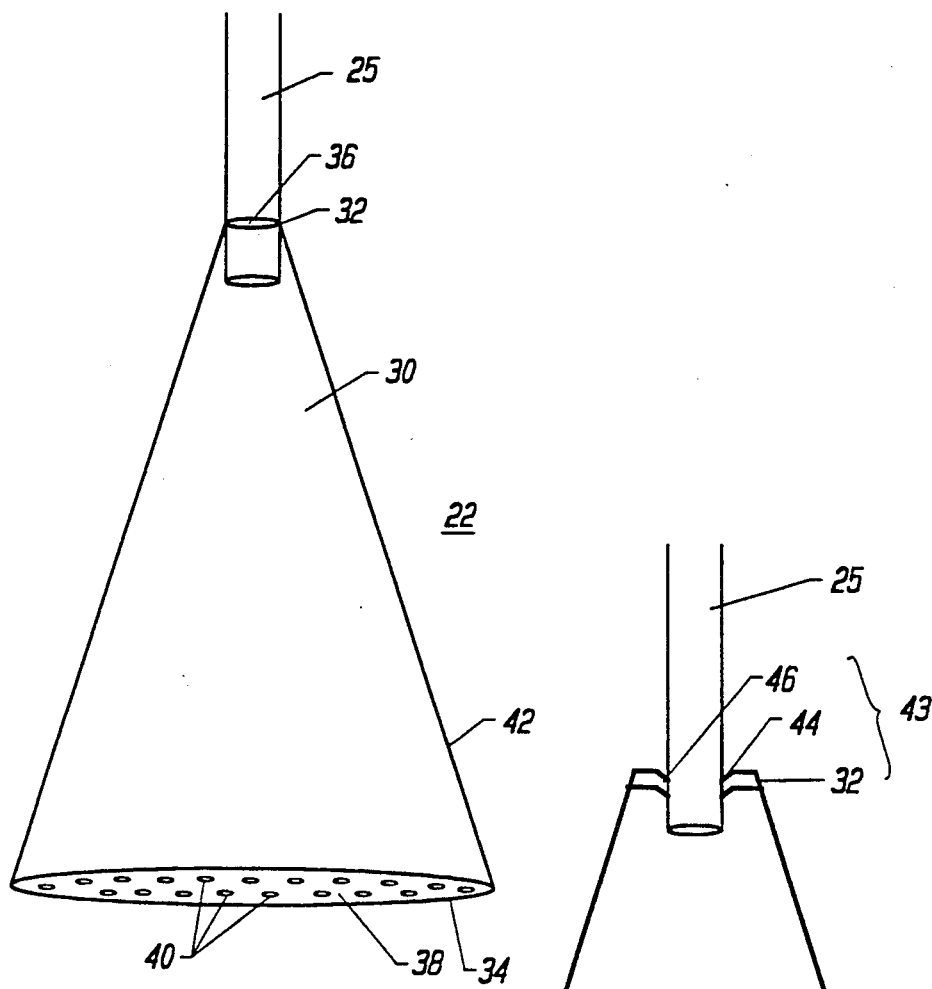
FIG. 2 is a side cross-sectional view of a first embodiment of a distributor according to the invention.

A preferred embodiment of distribution means 22 is shown in FIG. 2. In this embodiment, distribution means 22 comprises a cavity 30 having a top 32 and a bottom 34 vertically displaced from the top 32, an inlet port 36 in the top 32, and an outlet means 38 at the bottom 34. The outlet means 38 preferably includes a graywater-to-ground interface means comprising a perforate screen having a plurality of perforations 40 for allowing graywater to be released from cavity 30 into the soil. Perforations 40 preferably are of a size to allow particulates in the graywater not removed in filter system 14 to pass through the perforations 40 without clogging, while providing a barrier keeping soil or other external ground debris from floating up into cavity 30.

Figure 4:
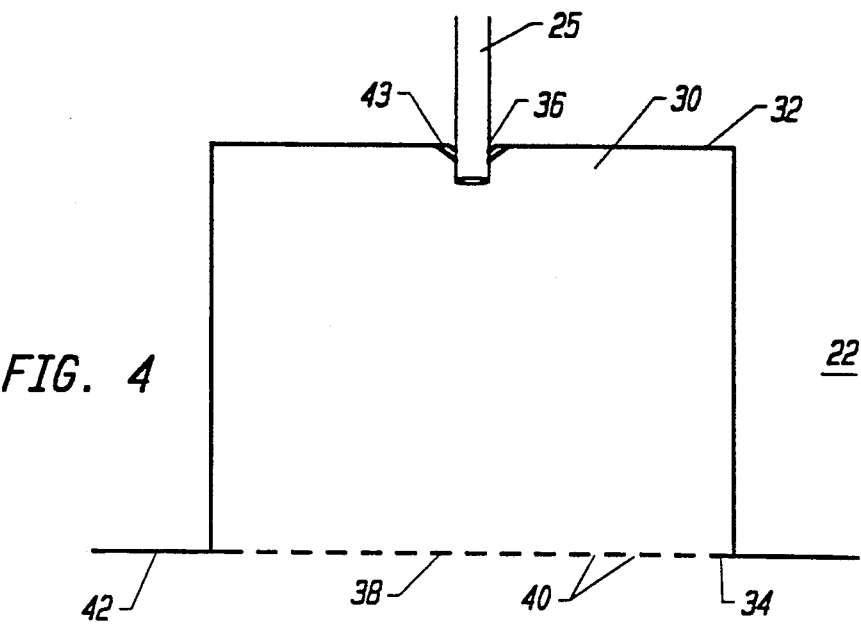
FIG. 4 is a side cross-sectional view of a third embodiment of a distributor according to the invention.

In a preferred embodiment, distribution means 22 has anchoring means 42 which prevent the distribution means 22 from "floating" upward or laterally due to the release of graywater through outlet means 38. Preferably, the distribution means is frustoconical in shape so that the weight of overlying soil on the walls of cavity 30 prevents such floating. In an alternative embodiment, shown in FIG. 4, distribution means 22 is a parallelopiped, wherein the anchoring means 42 is an outwardly extending flange on the exterior of distribution means 22.

Figure 3:
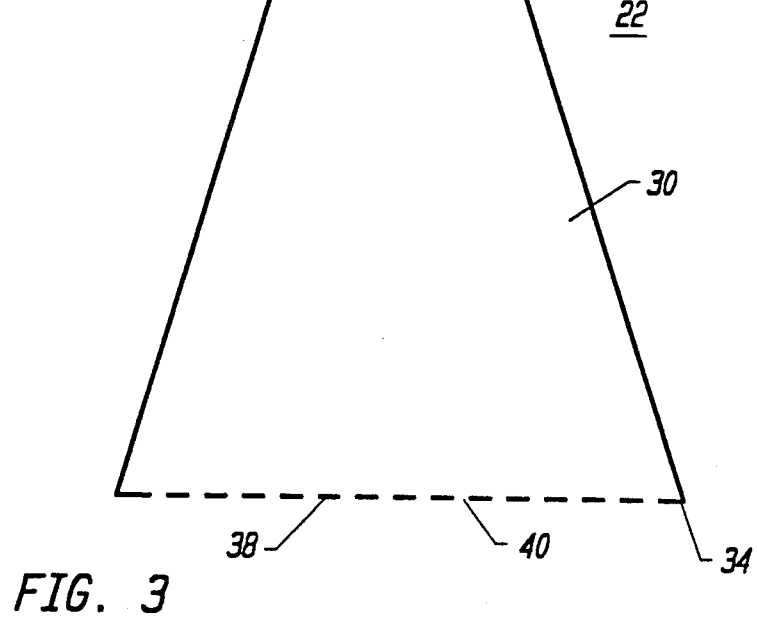
FIG. 3 is a side cross-sectional view of a second embodiment of a distributor according to the invention.

In another exemplary embodiment, illustrated in FIG. 3, distribution means 22 includes a neck 44 to which conduit 25 connects to distribution means 22. The neck 44 has, in one embodiment, barbs 46 on the internal surface of neck 44, the barbs 44 engaging the exterior of conduit 25 and securing it in place. In another embodiment, not shown, neck 44 extends upwardly from the top 32 of distribution means 22, with the barbs 46 disposed on the exterior of neck 44, the conduit 25 connecting over neck 44 and barbs 46. Connector means 43 provides a secure connection between conduit 25 and distribution means 22, to prevent disconnection of conduit 25 which might result in potentially dangerous and unlawful surface distribution of graywater.

Figure 5:
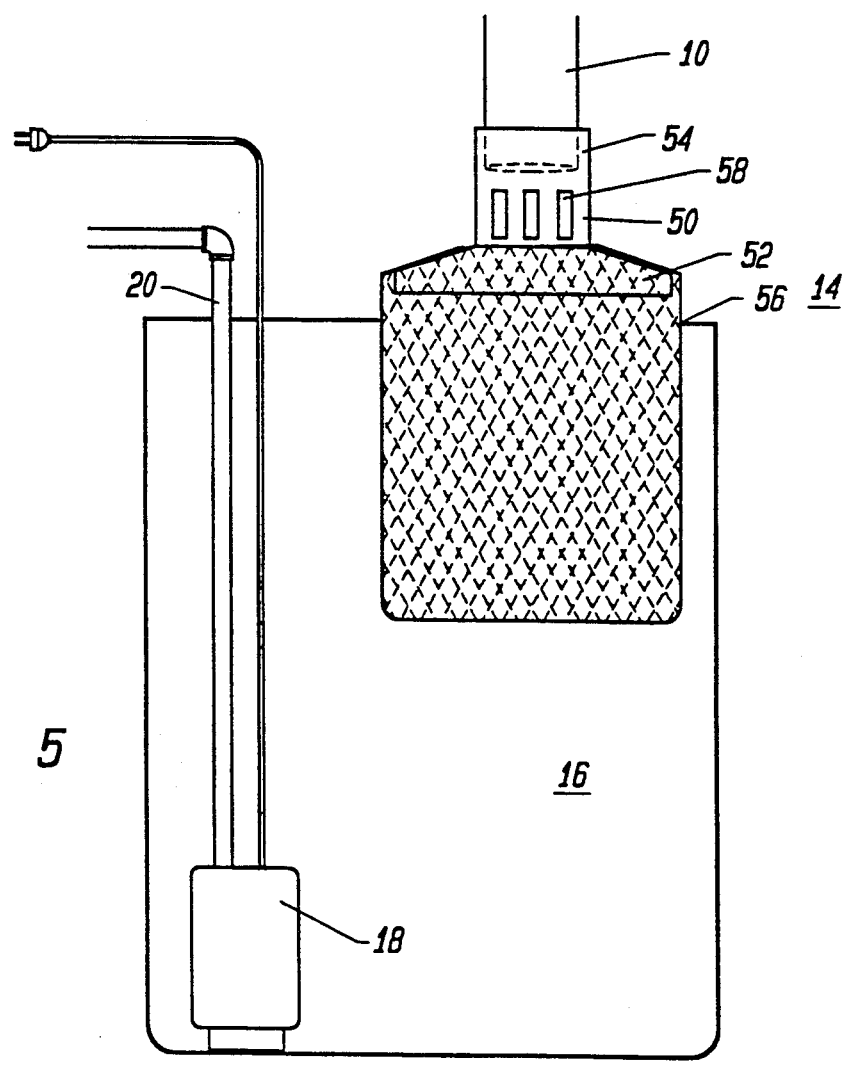
FIG. 5 is a side cross-sectional view of a filter system according to the invention.

The filtering system 14 of the graywater distribution system of the present invention is shown in FIG. 5. The filtering system preferably includes a bell-shaped filter holder 50, having an end 54 for connection to collection conduit 10, and a waist 52 of larger diameter than end 54 for holding a filter bag 56. The filter bag 56 may comprise, for example, a commercially available industrial polyester filter bag. Further, filter system 14 preferably comprises overflow orifices 58, which allow graywater in collection conduit 10 to flow into tank 16 in the event filter bag 56 is full.

While the above is a complete description of the preferred embodiments of the invention, various alternatives, modifications, and equivalents may be used. Therefore, the above description should not be taken as limiting the scope of the invention which is defined by the appended claims.

What is claimed is:

1. A method for distributing graywater from graywater sources exclusive of sewer sources, comprising the steps of:
   collecting graywater from graywater sources through closed conduits, said graywater containing suspended solids;
   delivering water via said closed conduits to an inlet of each one of a plurality of distribution means dispersed in a ground disribution area, each said distribution means comprising a cavity having a top and a bottom vertically displaced from the top configured to allow substantially unrestricted flow of graywater and suspended solids into said cavity means, an inlet port in the top, and an outlet means, said outlet means including a graywater-to-ground interface means forming the bottom; and
   releasing said graywater including said suspended solids in the cavity to the ground through the interface means.

2. The method according to claim 1 wherein said distribution means is buried below ground level.

3. The method according to claim 2 wherein said releasing step comprises feeding said graywater by gravity into the ground below ground level.

4. The method according to claim 2 wherein said releasing step comprises feeding said graywater under positive hydraulic pressure into the ground below ground level.

5. The method according to claim 2 wherein said releasing step comprises feeding said graywater under positive hydraulic pressure immediately in response to the presence of graywater in the cavity means into the ground below ground level.

6. The method according to claim 2 further including the step of filtering said graywater of a portion of said suspended solids prior to said delivering step.

7. An apparatus for distributing graywater including suspended solids from graywater sources exclusive of sewer sources into the ground below ground level comprising:
   a cavity means having a top and a bottom vertically displaced from the top;

an inlet port in the top for attachment of an inlet conduit said inlet port configured to allow substantially unrestricted flow of graywater and suspended solids into said cavity means; and an outlet means, said outlet means including a graywater-to-ground interface means forming the bottom, said graywater-to-ground interface means having a plurality of perforations of a size to allow passage of said suspended solids.

8. The apparatus according to claim 7 wherein said interface means comprises a perforate screen forming a bottom wall for burial below ground surface.

9. The apparatus according to claim 7 further including means for disposition below ground for anchoring said cavity means against vertical displacement in soil.

10. The apparatus according to claim 9 wherein said anchoring means comprises a flange disposed around an outer periphery of said cavity means.

11. The apparatus according to claim 8 wherein said cavity means comprises a frustoconical section from the top to the bottom for anchoring said distributing apparatus against vertical displacement upon burial of said distributing apparatus below ground level.

12. The apparatus according to claim 7 wherein said inlet means includes means for accepting one-time attachment of an inlet conduit into the top.

13. The apparatus according to claim 12 wherein said one-time attachment means comprises a neck having barbs.

14. The apparatus according to claim 13 wherein said barbs are internal to said neck.

15. The apparatus according to claim 13 wherein said barbs are external to said neck.

16. A system for distributing graywater from graywater sources exclusive of sewer sources, comprising:
means for collecting graywater including suspended solids from graywater sources through closed conduits; and
means for delivering water via said closed conduits to an inlet of each one of a plurality of distribution means dispersed in a ground distribution area, each said distribution means comprising a cavity having a top and a bottom vertically displaced from the top, an inlet port in the top configured to allow substantially unrestricted flow of graywater including suspended solids into said cavity means, and an outlet means, said outlet means including a graywater-to-ground interface means forming the bottom, said graywater-to-ground interface means having a plurality of perforations of a size to allow passage of said suspended solids, said delivering means for releasing said graywater below ground level into soil.

17. The apparatus according to claim 16 further including means for injecting said graywater into the ground below ground level by positive hydraulic pressure.

18. The apparatus according to claim 16 further including means coupled to said collecting means for filtering said graywater of suspended graywater solids.

19. The apparatus according to claim 18 wherein said filtering means comprises a filter holder, an overflow means and a replaceable perforate polyester cloth.

20. The apparatus according to claim 16 wherein said collecting means comprises a tank with an inlet at a top side of said tank, a filter holder coupled to said inlet, a filter bag depending from said filter holder for capturing solids falling through said filter holder and for passing graywater received through said inlet into said tank, a pump means for pumping graywater from said tank into said delivering means, wherein said filter holder includes overflow means comprising orifices in said filter holder above said depending filter bag for allowing excess graywater to overflow said filter bag into said tank.

21. The apparatus according to claim 20 wherein said tank is open to air.

* * * * *